US007634191B2

(12) United States Patent
Kleverman et al.

(10) Patent No.: US 7,634,191 B2
(45) Date of Patent: Dec. 15, 2009

(54) PORTABLE COMMUNICATION DEVICE EQUIPPED WITH AN ELECTRONIC FLASH HAVING A LED IGNITION DEVICE

(75) Inventors: Mats Kleverman, Helsingborg (SE); Gunnar Klinghult, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 313 days.

(21) Appl. No.: 11/466,189

(22) Filed: Aug. 22, 2006

(65) Prior Publication Data

US 2007/0297782 A1 Dec. 27, 2007

Related U.S. Application Data

(60) Provisional application No. 60/805,444, filed on Jun. 21, 2006.

(51) Int. Cl.
*G03B 15/03* (2006.01)
*H05B 41/14* (2006.01)
*H04M 1/00* (2006.01)

(52) U.S. Cl. ................... 396/155; 348/371; 315/241 P; 455/556.1

(58) Field of Classification Search ................... 396/56, 396/129, 155, 157, 164, 182, 201–204; 348/370, 348/371; 455/422.1, 556.1; 315/241 P, 241 S
See application file for complete search history.

(56) References Cited

U.S. PATENT DOCUMENTS

| | | | | |
|---|---|---|---|---|
| 5,678,077 | A | 10/1997 | Ichikawa et al. | |
| 2003/0013484 | A1 | 1/2003 | Nishimura et al. | |
| 2005/0134723 | A1 | 6/2005 | Lee et al. | |
| 2005/0218823 | A1 * | 10/2005 | Dowe | 315/200 R |
| 2005/0254810 | A1 | 11/2005 | Yamashita | |
| 2005/0265709 | A1 | 12/2005 | Kim et al. | |
| 2008/0273112 | A1 * | 11/2008 | Sladen | 348/370 |

FOREIGN PATENT DOCUMENTS

EP 1 608 184 A1 12/2005

OTHER PUBLICATIONS

International Preliminary Report on Patentability for International Application No. PCT/IB07/000250 dated Oct. 8, 2008.

* cited by examiner

*Primary Examiner*—Rochelle-Ann J Blackman
(74) *Attorney, Agent, or Firm*—Renner, Otto, Boisselle & Sklar, LLP

(57) ABSTRACT

A portable communication device includes an image capture device, a light source unit operable to provide a flash of light and a flash ignition device. The flash ignition device includes a light emitting diode (LED) that provides optical output of an appropriate wavelength that is operable to trigger a flash of light from a gas discharge tube within the light source unit. The provision of a LED in the flash ignition device provides ionization of gas within the gas discharge tube via photoionization and/or the photoelectric effect.

11 Claims, 3 Drawing Sheets

PORTABLE COMMUNICATION DEVICE EQUIPPED WITH AN ELECTRONIC FLASH HAVING A LED IGNITION DEVICE

RELATED APPLICATION DATA

The present application claims the benefit of U.S. Provisional Application Ser. No. 60/805,444, filed Jun. 21, 2006, the disclosure of which is herein incorporated by reference in its entirety.

TECHNICAL FIELD OF THE INVENTION

The present invention relates generally to portable communication devices, and, more particularly, to a portable communication device equipped with an electronic flash having a LED ignition device.

DESCRIPTION OF RELATED ART

In recent years, portable communication devices, such as mobile phones, personal digital assistants, mobile terminals, etc., continue to grow in popularity. As the popularity of portable communication devices continues to grow, today's wireless landscape is rapidly changing as mobile phones and networks are being enhanced to provide features and services beyond voice communications. The wireless industry is experiencing a rapid expansion of mobile data services and enhanced functionality. In addition, the features associated with certain types of portable communication devices have become increasingly diverse. To name a few examples, many portable communication devices have text messaging capability, Internet browsing functionality, electronic mail capability, video playback capability, audio playback capability, image display capability and hands-free headset interfaces.

With the popularization of digital cameras, many portable communication devices are equipped with relatively small digital cameras contained within the device housing. Typically, these cameras include a flash to supply light in an amount sufficient for capturing a picture in low or dim lighting. The flash lighting is provided by a flash tube, e.g., a xenon flash tube, which is ignited or otherwise powered by a trigger or ignition circuit. Conventional trigger circuits include two or more voltage transformers in conjunction with large capacity capacitors that provide a relatively high voltage, e.g., 200-400 volts, in conjunction with a high voltage trigger, e.g., 2,000-5000 volts.

As demand increases for smaller portable communication devices at lower costs, a premium is placed on the ability to design smaller portable communication devices with simplified electronics.

SUMMARY

In view of the foregoing, a need exists for a portable communication device that includes a light source unit having a flash ignition device that is smaller in scale, simpler in design and/or more cost effective.

One aspect of the invention relates to a portable communication device that includes an image capture device, a light source unit operable to provide a flash of light and a flash ignition device including a light emitting diode (LED) that provides optical output operable to trigger a flash of light from the light source unit.

According to another aspect, the light source unit includes xenon flash tube.

According to another aspect, the LED provides optical output having an ultraviolet wavelength.

According to another aspect, the light source unit includes a gas discharge tube.

According to another aspect, the LED is configured to emit light incident on a gas within the gas discharge tube.

According to another aspect, light emitted by the LED is of a wavelength suitable to ionize the gas within the gas discharge tube.

According to another aspect, the gas discharge tube includes an anode and a cathode, and wherein the LED is configured to emit light incident on the cathode.

According to another aspect, the cathode is comprised of a material that releases electrons into a gas within the gas discharge tube in response to incident light from the LED.

According to another aspect, the portable communication device is a mobile telephone.

Another aspect of the invention relates to a light generating device that includes a gas discharge tube that produces a flash of light in response to a flash trigger and a flash trigger including a light emitting diode (LED) that provides optical output operable to trigger a flash of light in the gas discharge tube.

According to another aspect, the gas discharge tube includes xenon gas.

According to another aspect, the LED provides optical output having an ultraviolet wavelength.

According to another aspect, the LED provides optical output operable to photoionize a gas within the gas discharge tube.

According to another aspect, the gas discharge tube includes a cathode, and the LED provides optical output incident on the cathode operable to liberate electrons from the cathode into the gas discharge tube.

Another aspect of the invention relates to a camera having an electronic flash, wherein the camera includes a gas discharge tube that emits a flash of light in response to an energy trigger and a flash trigger circuit including a light emitting diode (LED) that provides optical output operable to trigger a flash of light in the gas discharge tube.

According to another aspect, the LED provides optical output having an ultraviolet wavelength.

According to another aspect, the gas discharge tube includes a cathode, and the LED provides optical output incident on the cathode operable to liberate electrons from the cathode into the gas discharge tube.

According to another aspect, the LED provides optical output incident on a gas within the gas discharge tube, the optical output being operable to photoionize the gas within the gas discharge tube.

According to another aspect, the flash trigger circuit includes a battery and a transformer that converts battery voltage to a voltage of at least about 300 volts.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
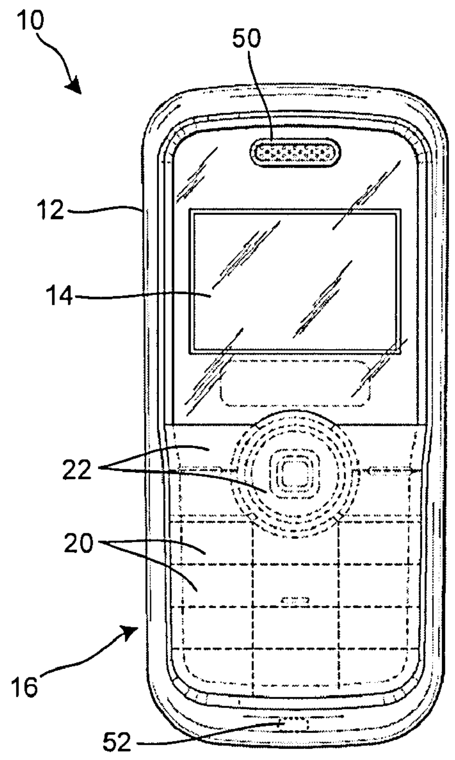
FIG. 1 is a schematic front view of a mobile telephone as an exemplary portable communication device on which aspects of the present invention are carried out.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

As used herein, the term "portable communication device" includes portable radio communication equipment. The term "portable radio communication equipment", which herein after may be referred to as a mobile telephone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like. While the present invention is being discussed with respect to portable communication devices, it is to be appreciated that the invention is not intended to be limited to portable communication devices, and can be applied to any type of electronic equipment capable of acquiring or otherwise capturing an image, e.g., a digital camera. In addition, aspects of the invention can be applied to any type of electronic equipment in which a flash of light may be generated.

Figure 2:
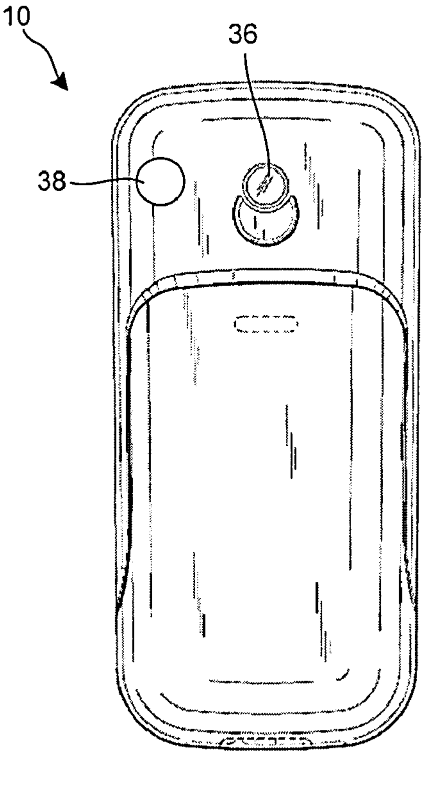
FIG. 2 is a schematic rear view of the mobile telephone of FIG. 1.

Referring initially to FIG. 1 and FIG. 2, a portable communication device 10 is shown in accordance with the present invention. As is described more fully below, the portable communication device 10 includes a camera and a light source unit, e.g., a flash, having a light emitting diode (LED) ignition device. It will be appreciated that the light source unit, including the LED ignition device, may be employed in a variety of other types of electronic equipment, e.g., in digital cameras, without departing from the scope of the present invention.

The portable communication device in the illustrated embodiments is a mobile telephone and will be referred to as the mobile telephone 10. The mobile telephone 10 is shown as having a "brick" or "block" form factor housing 12, but it will be appreciated that other type housings, such as a clamshell-type housing or a slide-type housing, may be utilized.

The mobile telephone 10 includes a display 14 and keypad 16. The display 14 displays information to a user such as operating state, time, telephone numbers, contact information, various navigational menus, etc., which enable the user to utilize the various features of the mobile telephone 10. The display 14 may also be used to visually display content received by the mobile telephone 10 and/or retrieved from a memory 22 (FIG. 2) of the mobile telephone 10. In addition, an image may be displayed on the display 14, such as a photograph taken by a camera of the mobile telephone 10 or a photo preview image when the display 14 functions as an electronic viewfinder for the camera.

The keypad 16 may provide for a variety of user input operations. For example, the keypad 16 may include alphanumeric keys 20 for allowing entry of alphanumeric information such as telephone numbers, phone lists, contact information, notes, etc. In addition, the keypad 16 may include special function keys 22 such as a "call send" key for initiating or answering a call, and a "call end" key for ending or "hanging up" a call. Special function keys 22 may also include menu navigation keys, for example, for navigating through a menu displayed on the display 14 to select different telephone functions, profiles, settings, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 includes conventional call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. The call circuitry also may be responsible for transmitting text messages that are prepared by the user.

Additional components of the mobile telephone 10 will be described with reference to the functional block diagram of FIG. 3. For the sake of brevity, generally conventional features of the mobile telephone 10 will not be described in great detail herein. The mobile telephone 14 includes a processor 24 (also referred to as a control circuit) for controlling the overall operation of the portable communication device. The processor 24 may include any commercially available or custom microprocessor. Memory 26 is operatively connected to the processor 24 for storing control programs and data used by the portable communication device. The memory 26 is representative of the overall hierarchy of memory devices containing software and data used to implement the functionality of the portable communication device.

In the illustrated embodiment, memory 26 stores device drivers 28, e.g., I/O device drivers, application programs 30, including, for example, a photo application 32 for handling photos taken using the mobile telephone, and application program data 34, e.g., data representative of photos taken using the mobile telephone. The I/O device drivers include software routines that are accessed through the processor 24

(or by an operating system (not shown) stored in memory 26) by the application programs 30 to communicate with devices such as the display 16 and other input/output ports. The application programs 30 comprise programs that implement various features of the mobile telephone 10, such as e-mail, Internet access, contact manager and the like.

In the illustrated embodiment, the mobile telephone includes a camera 36 for taking or otherwise capturing digital pictures and/or movies. Data representative of any still or moving picture may be stored in the memory 26 or transmitted to a remote location, e.g., to another mobile telephone or another portable communication device. The camera 36 typically includes a solid-state imaging element, e.g., CCD (charge coupled device) or a CMOS (complementary metal oxide semiconductor). Light source unit 38 is operable to emit a flash of light for assisting the camera in capturing images in certain illumination conditions, e.g., low-light conditions. The light source unit 38 includes a flash ignition device 40 to ignite or otherwise trigger a flash of light from the light source unit 38. As is described more fully below, the flash ignition device includes a light emitting diode (LED) for triggering a flash of light in a flash tube of the light source unit. A power supply 42, typically including a battery, provides power to the various parts of the mobile telephone, such as the display and the light source unit, for carrying out the various functionality of the mobile telephone.

Figure 3:
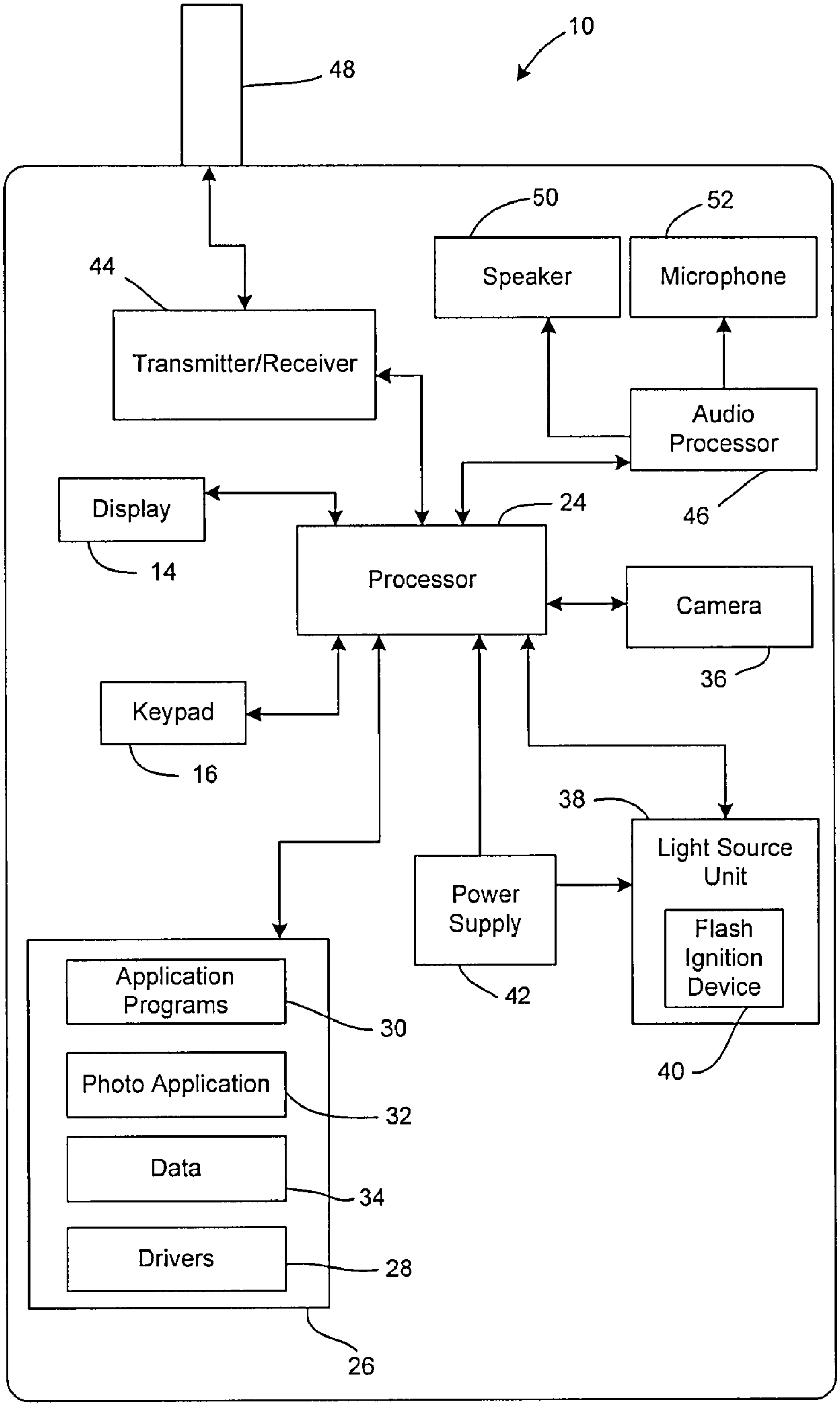
FIG. 3 is a functional block diagram of an exemplary mobile telephone including a flash ignition device in accordance with the present invention.

With continued reference to FIG. 3, the processor 24 interfaces with the display 14, various user interface controls, actuators or input devices, including keypad 16, a transmitter/receiver 44 (often referred to as a transceiver) and audio processing circuitry, such as an audio processor 46, e.g., an audio processing circuit. Of course, the user interface unit may include actuators or input devices that allow the user to interface with the mobile telephone. For example, keypad 16 allows the user to dial numbers, enter commands and data, and select options. The display 14 allows the user to view a variety of information, such as dialed digits, stored information, and images (still or moving) captured by the camera 36.

An antenna 48 is coupled to the transmitter/receiver 44 such that the transmitter/receiver 50 transmits and receives signals via the antenna 48, as is conventional. The mobile telephone 10 includes an audio processor 46 for processing the audio signal transmitted by and received from the transmitter/receiver 44. Coupled to the audio processor 46 are a speaker 50 and microphone 52, which enable a user to listen and speak via the portable communication device.

Figure 4:
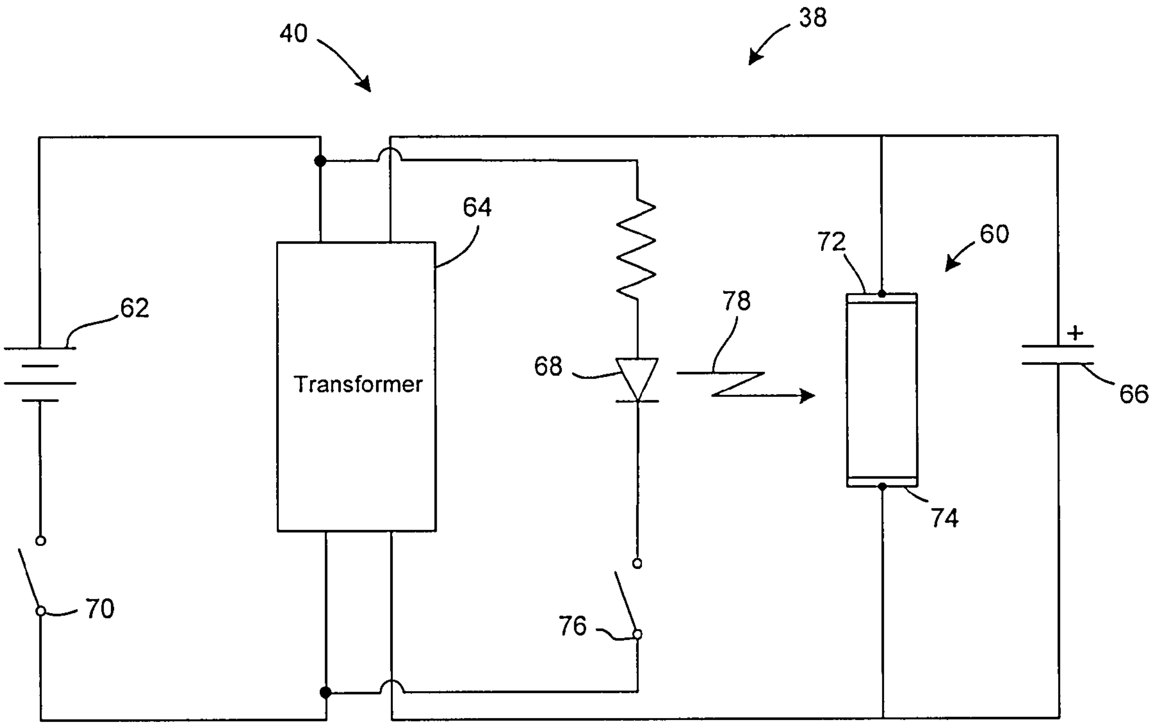
FIG. 4 is a circuit diagram depicting a flash ignition device in accordance with an embodiment of the present invention.
Figure 5:
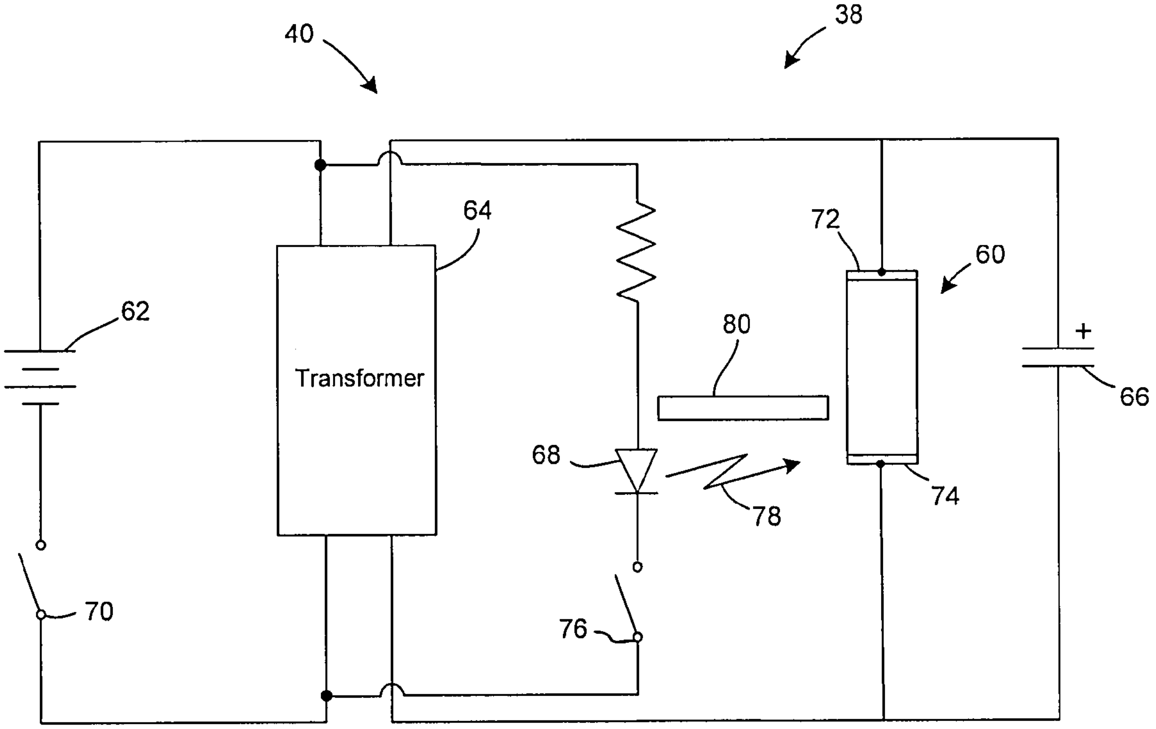
FIG. 5 is a circuit diagram depicting a flash ignition device in accordance with another embodiment of the present invention.

While for purposes of simplicity of explanation, the circuit diagrams in FIG. 4 and FIG. 5 include particular arrangements of circuit components to provide relevant operation of the light source unit 38 and the associated flash ignition device 40, it is to be understood and appreciated that aspects of the present invention are not limited to the exact arrangement of circuit components depicted in the figures, as some components may, in accordance with aspects of the present invention, be present in different arrangements from those shown and described herein. Moreover, not all of the circuit elements may be required to provide a light source unit 38 and flash ignition device 40 in accordance with an aspect of the invention, provided that the flash ignition device employs a light emitting diode (LED) to trigger or otherwise ignite a flash of light from gas within a gas through a gas discharge tube.

Turning now to FIG. 4, light source unit 38 includes a flash ignition device or circuit 40 for igniting or otherwise triggering a flash of light in a gas discharge tube 60, e.g., a xenon tube. As is described more fully below, the flash ignition device employs a light emitting diode (LED) for igniting or otherwise triggering the flash discharge of light in the gas discharge tube. It will be appreciated that use of a LED in a flash ignition device reduces the overall complexity of the flash ignition device in terms of the number of components required as well as the overall cost thereof. The flash ignition device includes a power supply battery 62, e.g., a standard battery that is found in a mobile telephone, a DC-DC converter or transformer 64 (also referred to as a step-up transformer or a voltage booster) that boosts the voltage from the battery 62 to a predetermined relatively high voltage level, a main capacitor 66 that accumulates charge at the relatively high voltage level and a LED ignition device 68 that ignites gas within the gas discharge tube 60. It will be appreciated that the term “LED ignition” or “LED ignition device,” as used herein, is not limited to a light emitting diode. Rather, other light producing devices, including, but not limited to, laser diodes, Super Cap LEDs (devices including an LED and a capacitor) and the like may be employed to provide a flash of light whose intensity in sufficient to trigger flash discharge in the gas discharge tube via one or both of the photoelectric effect and photoionization effect.

A series circuit including the battery 62 and a power switch 70 is connected to input terminals of the transformer 64. Closing of power switch 70 may be actuated by a user pressing or otherwise actuating a button or key to take a picture using the camera 36 of the mobile telephone 10. After the power switch 70 is closed, the voltage from the battery 62 is applied to the transformer 64, which boosts the voltage from the battery level to a predetermined level of DC voltage, e.g., about 300 volts. Alternatively, the predetermined level of DC voltage may be greater or less than about 300 volts.

For purposes of the discussion contained herein, transformer 64 is illustrated schematically. It will be appreciated that the functionality associated with the voltage step-up provided by transformer 64 may be accomplished using a variety of electrical implementations. For example, the transformer 64 simply may include a primary coil and a secondary coil along with a switching element, e.g., a suitable transistor, or other oscillator that intermittently interrupts at a prescribed frequency the voltage from the battery 62 that is applied to the primary coil of the step-up transformer. In addition, other components, such as diodes, may be employed to, for example, prevent reflux of a discharge current to the primary coil during flash light generation. In addition, one or more other diodes may be employed to rectify the power output from the secondary coil of the step-up transformer 64. Of course other electrical implementations may be implemented to provide a voltage boosting or step-up without departing from the scope of the present invention.

The gas discharge tube 60 and main capacitor 66 are connected in parallel fashion to the output terminals of transformer 64. In one embodiment, the gas discharge tube 60, which includes an anode 72 and a cathode 74, is a xenon gas tube. Other types of gas discharge tubes may be employed without departing from the scope of the present invention. Artisans will appreciate that the gas discharge tube emits light as the gas within the tube discharges in response to an appropriate stimulus.

Capacitor 66 stores the high-voltage charge from the transformer 64. The capacitor 66 will hold the high-voltage charge until it is connected to a closed circuit. While the capacitor constantly is connected to the two electrodes, e.g., the anode 72 and the cathode 74, of the gas discharge tube, the gas discharge tube 60 cannot conduct current unless the gas contained therein is ionized. As illustrated, the flash triggering LED 68 is connected in series with switching elements 76. Switching element 76 can be any suitable switching element, including, but not limited to, a semiconductor element such as a power FET, a power transistor, SCR (semiconductor controlled rectifier) and the like. In a preferred embodiment, the switching element 76 is a high-power and high-response IGBT (insulated gate bipolar transistor). Of course other suitable switching elements may be employed without departing from the scope of the present invention.

After the switching element 76 is in a closed position, current may pass through the LED 68 thereby causing the LED to emit a flash of light (represented by reference numeral 78) incident on the gas within the gas discharge tube 60. It is believed that the light 78 emitted by the LED 68 will cause direct photoionization of the gas within the gas discharge tube 60. Ionization of the gas, e.g., the xenon gas, leads to gas ions and free electrons, e.g., plasma, and the charged particles accelerate in the electric field across the gas discharge tube, which leads to further ionization of the gas when the electrons collide with the gas atoms (sometimes referred to as the avalanche effect). Once the gas within the gas discharge tube 60 is ionized, the gas within the gas discharge tube becomes conductive, thereby allowing the capacitor to discharge through the gas discharge tube, which causes a flash of light to be emitted. Of course, the emission of the flash of light is timed to be in sync with the camera application, e.g., the shutter of the camera opening.

In one embodiment in which the gas discharge tube is a xenon tube, the LED is chosen such that the light emitted therefrom has a wavelength in the ultraviolet (UV) range. It is believed that a LED that emits light having a UV wavelength is suitable for photoionization of xenon gas. However, it is to be appreciated that other LEDs emitting light of other wavelengths may be suitable for use in conjunction with a xenon gas tube and/or a gas discharge tube having gas other than xenon. That is, the wavelength of light emitted by the LED should be chosen to be a suitable match for ionizing the particular gas within the gas discharge tube.

Referring now to FIG. 5, an alternative embodiment of the light source unit 38 and flash ignition device 40 is provided. It will be appreciated that like elements will be referred to using like reference numerals with respect to FIG. 4. As discussed above with reference to FIG. 4, the flash ignition device 40 includes a battery 62 in series with a switching element 70 connected to input terminals of a transformer 64 and a flash triggering LED 68 (in series with a switching element 76). A gas discharge tube 60, e.g., a xenon gas tube and a capacitor 66 are connected to the output terminals of transformer 64 in a parallel fashion. The operation of the light source unit 38 and flash ignition device 40 is similar to the operation described more fully above with reference to FIG. 4.

Once the switching element 76 closes, e.g., in response to a trigger connected to the camera application, current flows through the flash triggering LED 68, thereby causing the LED 68 to emit light of a given wavelength (depending upon the type of LED that is employed). In the embodiment illustrated in FIG. 5, light emitted by the LED 68 is directed toward or otherwise focused on the cathode 74 of the gas discharge tube 60. Optionally, appropriate shielding 80 may be employed to focus light on the cathode and/or shield light from incidence on other portions of the light source unit. It is believed that the light emitted by the LED will liberate electrons from the cathode, e.g., by the photoelectric effect. Electrons liberated from the cathode by way of the photoelectric effect may accelerate in the field across the gas discharge tube, and, by collision with the gas atoms, ions and free electrons will be produced, and by the ionization avalanche effect, a flash of light will be ignited. It will be appreciated that the cathode may be made of any suitable metal or non-metal material, e.g., a metal or non-metal that emits electrons in response to incident radiation at longer wavelengths/lower energy. In turn, the wavelength of the LED 68 will be chosen to maximize the emission of electrons from the cathode via the photoelectric effect.

In another embodiment, one or more LEDs may be employed to ignite a flash of light in the gas discharge tube, for example, by emitting light toward or otherwise incident on the gas in the gas discharge tube, thereby facilitating photoionization of the gas within the gas discharge tube, and/or by emitting light toward or otherwise incident on the cathode, thereby releasing electrons from the cathode material by way of the photoelectric effect. In one embodiment, the gas discharge tube 60 will be made of a material that is transparent to light and able to withstand the high temperature changes typically associated with a flash of light being generated.

In another alternative embodiment, the flash igniting LED may be integrated into the gas discharge tube. For example, the flash igniting LED 68 may be integrated such that a portion of the tube acts as a waveguide directing light toward the gas within the gas discharge tube. Alternatively, the LED may be integrated into the gas discharge tube such that light is directed toward the cathode of the discharge tube.

It will be appreciated that the provision of a flash igniting LED (instead of, for example, one or more additional step-up transformers or the like) allows for a flash ignition device that may be smaller in size and simpler in construction and cost. For example, one benefit of the flash ignition device described herein is that the insulation distance to other components is reduced. While aspects of the invention have been described with respect to a camera, light source and flash ignition device incorporated within the housing of a portable communication device, e.g., a mobile telephone, it will be appreciated that the light source unit and flash emitting device described herein may be implemented in connection with any image acquisition device, e.g., a digital camera that makes use of a flash of light for capturing images in certain illumination conditions.

One of ordinary skill in the art will appreciate that the method and device described herein with reference to exemplary embodiments will lend itself of a variety of other applications that are contemplated to be within the scope of the present invention. For example, the device may be configured to take advantage of both the photoionization effect and the photoelectric effect without departing from the scope of the invention herein described.

As will be appreciated by one of skill in the art, computer program elements and/or circuitry elements of the invention may be embodied in hardware and/or in software (including firmware, resident software, microcode, etc.). The invention may take the form of a computer program product, which can be embodied by a computer-usable or computer-readable storage medium having computer-usable or computer-readable program instructions, “code” or a “computer program” embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A portable communication device comprising:

an image capture device;

a light source unit operable to provide a flash of light, wherein the light source unit includes a gas discharge tube; and a flash ignition device including a light emitting diode (LED) that provides optical output operable to trigger a flash of light from the light source unit;

wherein the gas discharge tube includes an anode and a cathode, and wherein the LED is configured to emit light incident on the cathode, wherein the cathode is comprised of a material that releases electrons into a gas within the gas discharge tube in response to incident light from the LED.

2. The portable communication device according to claim 1, wherein the light source unit includes xenon flash tube.

3. The portable communication device according to claim 2, wherein the LED provides optical output having an ultraviolet wavelength.

4. The portable communication device according to claim 1, wherein the portable communication device is a mobile telephone.

5. The portable communication device according to claim 1, further comprising:

shielding configured to focus light from the LED on the cathode and/or to shield light from incidence on other portions of the light source unit.

6. A light generating device comprising;

a gas discharge tube that produces a flash of light in response to a flash trigger; and a flash trigger including a light emitting diode (LED) that provides optical output operable to trigger a flash of light in the gas discharge tube;

wherein the gas discharge tube includes a cathode, and the LED is positioned and configured to provide optical output incident on the cathode operable to liberate electrons from the cathode into the gas discharge tube.

7. The light generating device according to claim 6, wherein the gas discharge tube includes xenon gas.

8. The light generating device according to claim 7, wherein the LED provides optical output having an ultraviolet wavelength.

9. A camera in combination with the light generating device according to claim 6.

10. The camera according to claim 9, wherein the flash trigger circuit includes a battery and a transformer that converts battery voltage to a voltage of at least about 300 volts.

11. The camera of claim 9, further comprising:

shielding configured to focus light from the LED on the cathode and/or to shield light from incidence on other portions of the light source unit.

* * * * *